C. B. FUNK.
HYDRAULIC TRANSMISSION.
APPLICATION FILED JUNE 5, 1916.

1,346,086.

Patented July 6, 1920.
6 SHEETS—SHEET 1.

Witnesses
J. W. Angell
Charles Hellog by

Inventor
Carlyle B. Funk.
Charles W. Tille Atty.

C. B. FUNK.
HYDRAULIC TRANSMISSION.
APPLICATION FILED JUNE 5, 1916.

1,346,086.

Patented July 6, 1920.
6 SHEETS—SHEET 5.

UNITED STATES PATENT OFFICE.

CARLYLE B. FUNK, OF CHICAGO, ILLINOIS.

HYDRAULIC TRANSMISSION.

1,346,086.　　　　　Specification of Letters Patent.　　Patented July 6, 1920.

Application filed June 5, 1916. Serial No. 101,737.

*To all whom it may concern:*

Be it known that I, CARLYLE B. FUNK, a citizen of the United States, and a resident of the city of Chicago, in the county of Cook and State of Illinois, have invented certain new and useful Improvements in Hydraulic Transmissions; and I do hereby declare that the following is a full, clear, and exact description of the same, reference being had to the accompanying drawings, and to the numerals of reference marked thereon, which form a part of this specification.

This invention relates to a unit type hydraulic power transmission wherein a drive is effected between the driving and driven members by causing a flow of fluid to take place therebetween, so that by control of the fluid flow, variations in speed or power may be obtained within a wide range and, at the same time a transmission of great flexibility and noiseless operation is secured.

It is an object therefore of this invention to construct a fluid power transmission mechanism for transmitting a drive between a driving and driven member wherein any one of a practically infinite number of speeds may be obtained by manipulation of means controlling the flow of the fluid.

It is also an object of this invention to construct a power transmission mechanism embracing pumping means for supplying fluid under pressure and a fluid motor connected with said pumping means to be driven by the fluid pumped therefrom, and with mechanisms associated with the system for controlling the flow of the fluid to vary the power transmitted or the rate of drive, as desired.

It is furthermore an important object of this invention to construct a device wherein fluid under pressure acts to drive a hydraulic motor connected to a driven member, the flow to said motor maintained by a fluid driving or pumping means connected to a power plant of any suitable type.

It is furthermore an important object of this invention to construct a fluid power transmission mechanism wherein the driving and driven members are associated within a single casing which is cored out and provided with suitable passages to admit of a flow between the driving and driven members of the transmission, together with suitable means for controlling the flow of fluid.

It is finally an object of this invention to construct a simple type of self-contained fluid transmission mechanism wherein the power transmitted and rate of drive is regulable by controlling the flow of the fluid.

The invention (in a preferred form) is illustrated in the drawings and hereinafter more fully described.

The transmission casing within which the driving and driven elements are mounted, is denoted as a whole by the reference numeral 1, and formed centrally therewithin is a transverse vertical wall or partition 2. Said partition wall 2, serves to divide the casing 1, into one compartment in which the driving member is mounted to pump the fluid, and another compartment in which the driven member is mounted to be driven by the fluid pumped by the driving member. The driving member and driven member of the transmission are identical in construction, and a sectional view through the driving end of the casing and the driving member and its component parts, is shown in detail in Fig. 7.

Figures 7, 8, 9, 10, 19:
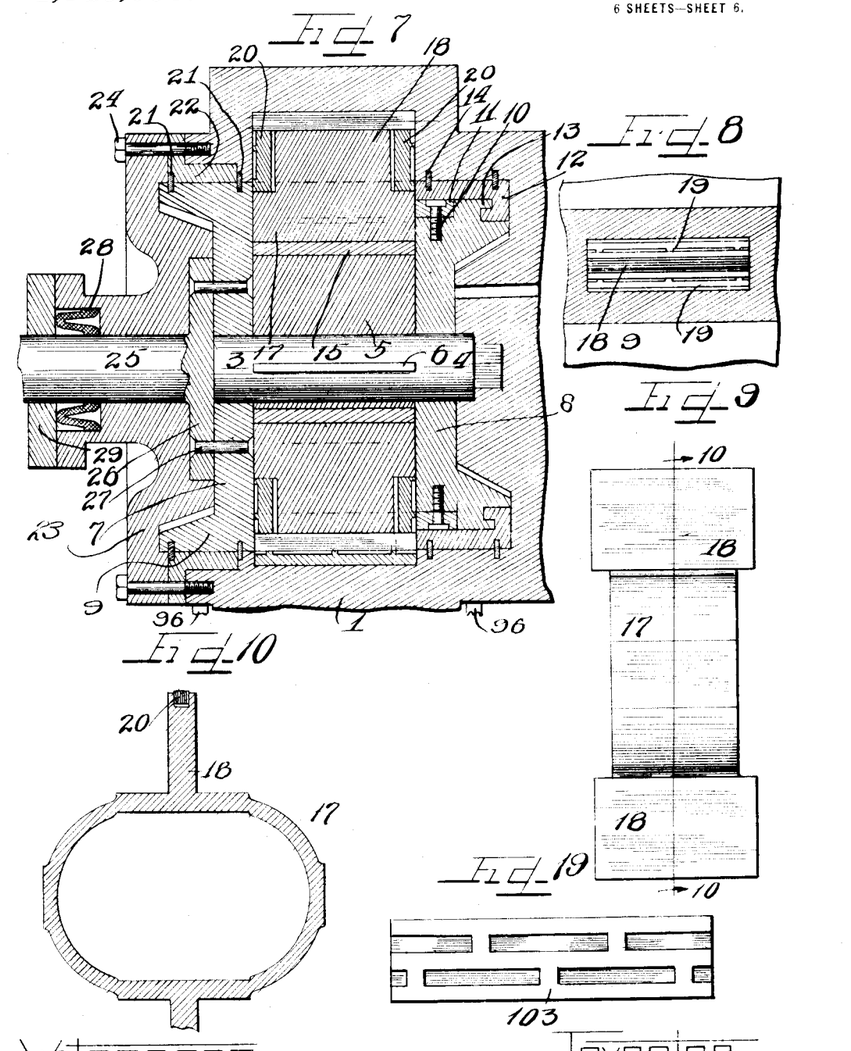
Fig. 7 is a section taken on line 7—7 of Fig. 3.
Fig. 8 is a detail section taken on line 8—8 of Fig. 3.
Fig. 9 is an exterior view of the crosshead piston member of a rotor used both in the driving and driven member of the transmission.
Fig. 10 is a detail section taken on line 10—10 of Fig. 9.
Fig. 19 is a fragmentary plan or development view of the labyrinth bearing packing member provided at one point in the inner wall of the casing of the transmission.
Figure 16:
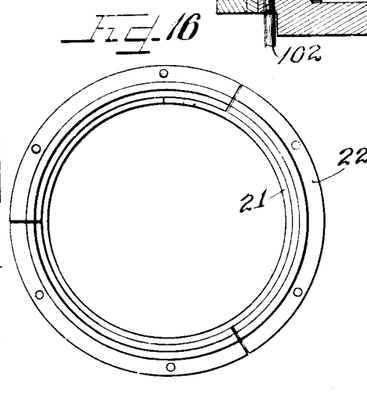
Fig. 16 is an elevational view of one of the sets of segmental retaining rings for packing material.
Figure 17:
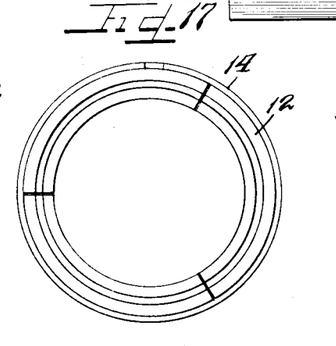
Fig. 17 is a similar view of another set of rings for a similar purpose.
Figure 18:
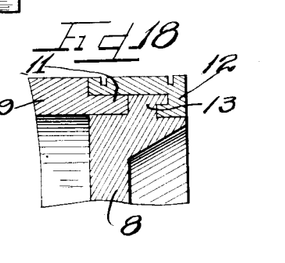
Fig. 18 is a detail section taken on line 18—18 of Fig. 2.

As shown, a short shaft 3, having a squared end 4, is mounted axially in the casing at one side of the partition wall 2, with the squared end 4, seating in a squared recess therefor in the partition wall, to hold said shaft rigidly in position and stationary within the casing. Mounted upon said shaft 3, is an eccentric cylinder 5, which is keyed rigidly thereon by a key 6, shown in Fig. 7. Journaled upon said shaft 3, at the ends thereof beyond the key 6, is a rotor comprising circular end members 7 and 8, respectively, and a hollow cylindrical portion 9, with which the circular end member 7, is integral, and to which the circular end member 8, is rigidly secured by means of machine screws 10, inserted through radial apertures of an extension 11, formed integral with said cylindrical member 9. A segmental ring 12, consisting of three segments, shown in Figs. 17 and 18, interfits with a peripheral flange 13, formed on the end member 8, and extends over the cylindrical extension 11, of the member 9, and is provided with peripheral grooves in which circular strips of packing 14, which fit into corresponding recesses provided therefor in the casing 1, are fitted. The purpose of making the ring 12, segmental, is to permit the same to be easily placed within the casing 1, to hold the packing rings 14, in place. Journaled upon the eccentric cylinder 5, within the rotor cylinder 9, is a ring 15, which at diametrically opposite sides, is provided with flattened surfaces 16, and slidably mounted upon the flattened portions 16, of said ring and rotatable as a unit therewith, is a yoke shaped crosshead member 17, flattened at its ends to slide within the cylinder 9, and which, on opposite sides, is provided with radial vanes or piston abutment members 18 which engage slidably through transverse slots provided therefor in the rotor cylinder 9. Packing material 19, is provided on each side of the slot in the cylinder 9, to bear against the piston members 18, slidable therethrough, and at the ends and outer surface of said piston members, packing material 20, is provided, recessed into said members as shown in Fig. 7. The other circular end member 7, which is integral with the cylindrical member 9, is provided with peripheral grooves to receive packing rings 21, therein, and a segmental ring 22, consisting of three sections, shown in detail in Fig. 16 and in section in Fig. 7, is provided to afford a bearing for said end member and furthermore hold the packing ring 21, in place. An end cover plate 23, is provided for the casing, which is bolted by means of bolts 24, to a peripheral flange of the segmental ring 22, and into the casing 1, whereby said segmental ring and said circular end cover plate 23, are held rigidly on the end of the casing. A driving shaft 25, connected to any suitable source of power, such as an engine or the like, is journaled through the end cover plate member 23, and on its inner end is provided with a disk coupling head 26, fitting and rotatable in a recess in the inner surface of the cover plate 23, and connected by bolts or rivets 27, to the end member 7, of the driving rotor of the transmission mechanism. The outer hub extension of the end cover plate member 23, is recessed and provided with packing material 28, and a packing gland 29, fits thereover and is secured thereto in any suitable manner.

Figure 3:
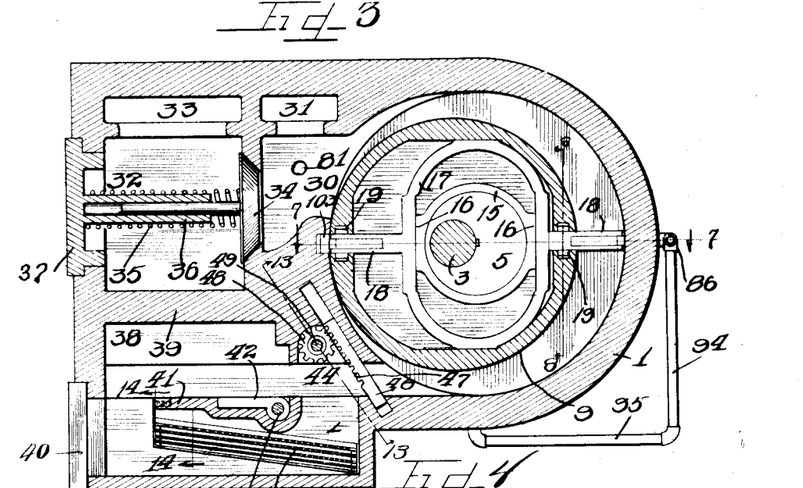
Fig. 3 is a section taken on line 3—3 of Fig. 2.

At one side of the chamber within which the driving rotor operates, a fluid outlet passage 30, is provided, as shown in Fig. 3, with a small air trap chamber 31, communicating in the upper end thereof and said passage 30, communicates through a valved outlet with an outlet or pressure chamber 32, having an air trap 33, formed at the upper end thereof, entrance into which is controlled by an automatic valve 34, normally held closed by a spring 35. The stem of said valve 34, is slidable in a long tubular extension 36, of a closure plug 37, which is threaded into one wall of the casing 1. Also formed within said casing 1, at one side of and communicating with the chamber within which the rotor 9, operates, is an inlet chamber 38, which is separated from the chamber 32, by a partition wall 39, formed integral within the casing 1. A closure plug 40, is provided in the walls of the casing 1, to give admission into said chamber 38, when necessary, and extending horizontally across said chamber 38, is a small recessed partition wall 41, in which is pivotally mounted a gate 42, on a shaft 43, adapted when swung upwardly to close off communication between the upper portion of the chamber 38, and an inlet passage 44, leading to the chamber within which the rotor 9, is mounted. Suspended beneath the partition 41, and releasably connected in inclined position, are a group of spaced screen trays 45, through which the fluid is constrained to flow when the gate 42, is swung upwardly, so that a flow takes place from the lower portion of the chamber 38, upwardly into the entrance passage 44, to the rotor.

Another mechanism is also provided to control the flow of fluid to the rotor through the entrance passage 44, leading thereto. This mechanism consists of a gate plate 46, as shown in Figs. 3 and 13, slidable in inclined position across the entrance passage 44, in guideway slots provided therefor on the interior of the casing 1, and provided with a toothed rack 47, centrally thereof, adapted to co-act with a pinion 48, secured upon a shaft 49, journaled through the casing 1, whereby said gate may be adjusted to any position to regulate the flow through the entrance passage 44, to the rotor 9.

Figure 4:
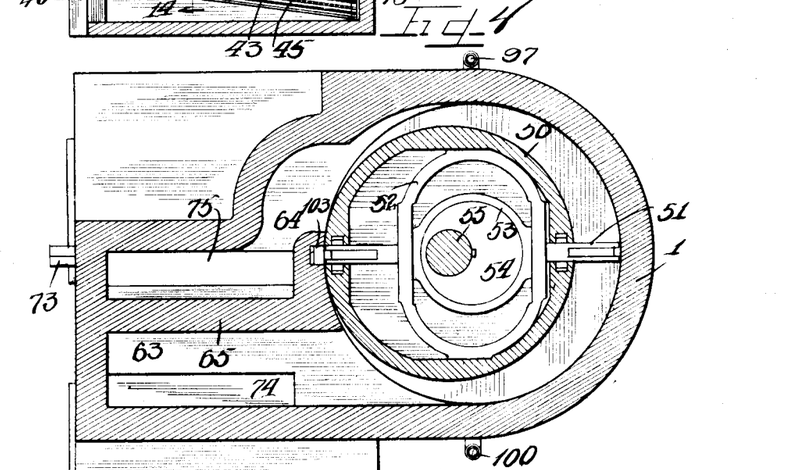
Fig. 4 is a section taken on line 4—4 of Fig. 2.

As already mentioned, the driven rotor of the transmission mechanism, also mounted within the casing 1, is exactly similar and identical with the driving rotor just described, and consists of a rotor cylinder 50, through which the piston abutments 51, slide, of a crosshead 52, operating therewith, a detail view of which is shown in Fig. 4. As in the construction previously described, the crosshead 52, is flattened on its ends and slides upon flat surfaces provided on the interior of the cylinder 50, and the inner sides of said crosshead are flattened and slide upon flattened surfaces of extensions of a ring 53, which is journaled upon an eccentric 54, rigid upon a shaft 55, stationary in the casing 1, with its squared end 56, seating in a complemental squared recess therefor. The driven rotor 50, is, as in the construction previously described, provided with a segmental retaining ring 57, for packing rings 58, at one side, and with packing rings 59, mounted in recesses of the integral extension 60, at the other end thereof, and the casing is closed by a cover plate 61, through which a driven shaft 62, bolted on the interior of the casing, to the integral end 60, of said rotor, extends. The chamber within which the driven rotor 50, operates, is provided with an inlet chamber 63, cored in the casing 1, at one side of the rotor chamber, and with an outlet chamber 64, disposed thereabove and separated from said inlet chamber by a partition 65.

Figures 5, 11, 13:
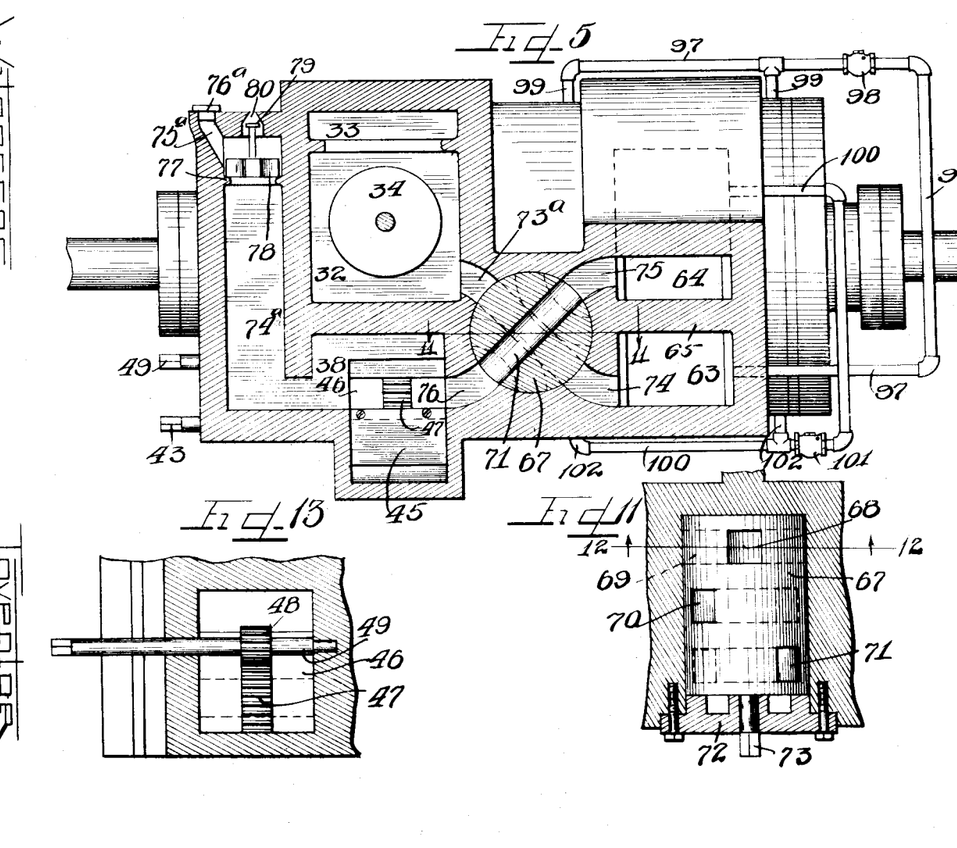
Fig. 5 is a section taken on line 5—5 of Fig. 2.
Fig. 11 is a detail section taken on line 11—11 of Fig. 5.
Fig. 13 is a fragmentary detail section taken on line 13—13 of Fig. 3.
Figure 12:
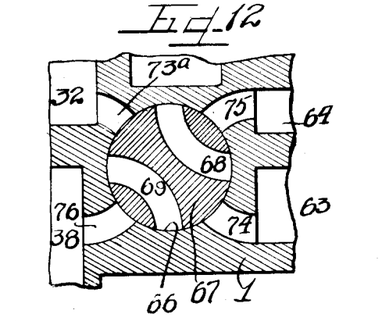
Fig. 12 is a section taken on line 12—12 of Fig. 11.
Figure 14:
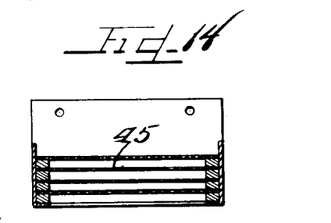
Fig. 14 is a fragmentary detail section taken on line 14—14 of Fig. 3, with parts omitted.
Figure 15:
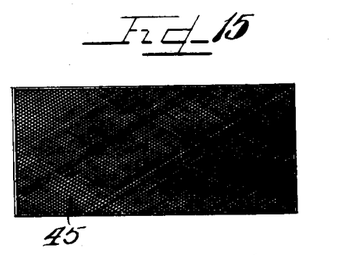
Fig. 15 is a plan view of the parts shown in Fig. 14.

Cored within the casing 1, between the respective inlet and outlet chambers of the respective driving and driven rotors, is a cylindrical chamber or compartment 66, within which is mounted a rotatable cylindrical valve element 67, shown in detail in Figs. 11 and 12. Said rotatable valve element 67, is provided with curved passages 68 and 69, in the same plane therethrough at one end thereof, another curved passage 70, through the middle thereof, and another curved passage 71, at the other end thereof. The cylindrical recess 66, within which said rotatable valve element 67, is mounted, is closed by a cover plate 72, shown in detail in Fig. 11, and an actuating stem 73, on said rotatable valve extends therethrough to which any suitable actuating means may be connected. An outlet passage 73ª, is provided at one side in the lower end of the chamber 32, as shown in Fig. 5, and an inlet passage 74, is provided at one side in the lower end of the inlet chamber 63, so that communication may be established therebetween through the passage 70, of the valve element. An outlet passage 75, is provided at one side of the chamber 64, and an inlet passage 76, is provided at one side of the inlet chamber 38, so that communication may be established through the passage 71, of the valve element when the same is so adjusted.

The valve element 67, has three positions of adjustment, the one such as shown in Fig. 5, that is, with the passage 70, affording communication between the outlet passage 73ª, and inlet passage 74, and the passage 71, affording communication between the outlet passage 75, and inlet passage 76, so that a flow of fluid from the driving rotor to the driven rotor may take place and return. Another position of adjustment is with the passage 68, in communication with the outlet passage 73ª, and passage 75, and with the passage 69, affording communication between the passage 74, and inlet passage 76, so that a flow may take place between the driving and driven rotor, but with the direction of flow to the driven rotor reversed, so that a reverse drive is affected. Another position of adjustment of the valve element 67, is one of neutral or idling position wherein the valve element is rotated so that the passage 69, short circuits the flow from the outlet passage 73ª, to the inlet passage 76, of the driving rotor, and the passage 68, effects communication between the passage 75, and passage 74, of the driven rotor.

Figure 2:
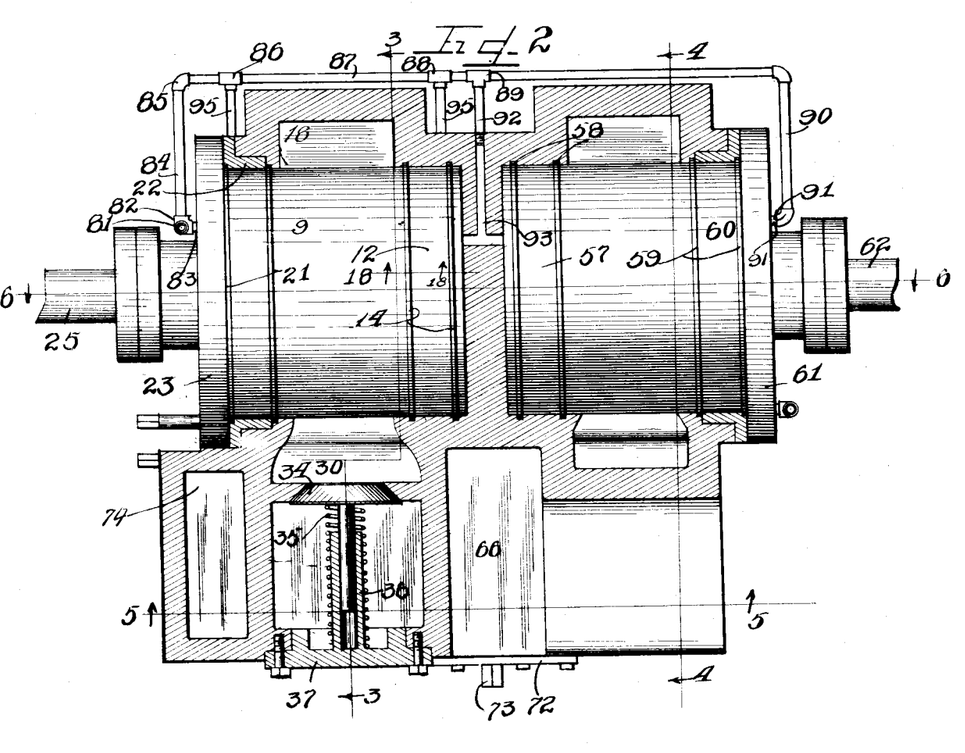
Fig. 2 is a section taken on line 2—2 of Fig. 1.

Formed in the main casing 1, at one end thereof adjacent the outlet or pressure chamber 32, of the driving rotor is a sump or well 74ª, shown in Figs. 2 and 5, which at its lower end communicates with the chamber 38, and a filler or entrance passage 75ª, is provided at the upper end thereof having a closure plug 76ª, by which the oil or other transmission fluid may be introduced. Normally resting upon an inner ledge 77, at the upper end of the sump well 74ª, is a float 78, and on the upper end of the stem thereof is a valve 79, adapted when the level of the oil rises in the sump well and elevates the float, to close a vent outlet passage 80, to prevent escape of oil therethrough.

Figure 1:
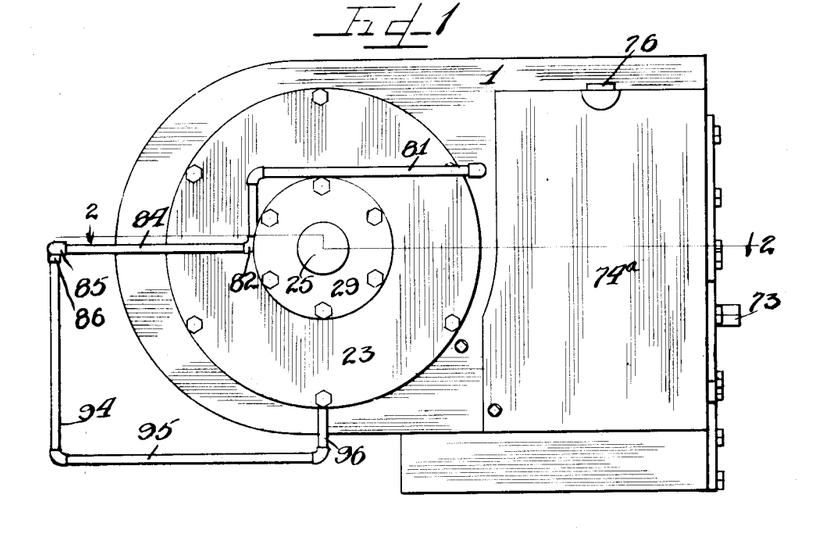
Figure 1 is an exterior end view of a device embodying the principles of my invention.

A novel lubricating and pressure equalizing scheme of connections by the use of suitable piping for the purpose is utilized in this transmission. Referring to Figs. 1, 2, and 3, a pipe 81, communicates through the end wall of the casing 1, into the pressure chamber 30, and extends along the exterior at the end of the casing and branches downwardly into a three way L 82, from which a pipe 83, leads inwardly through the end cover plate 23, as shown in Fig. 2, to admit oil under pressure to the end of the rotor. Leading outwardly from the L 82, is a pipe 84, which is connected to an L 85, and a short pipe section to a T 86. A pipe 87, is connected on from the T 86, to another T 88 and 89, and at its end leads to a pipe 90, L 91, and by a pipe 92, through the end cover plate 61, for admission to the end of the rotor similar to the pipe 83, described. A short pipe section 92, is connected into the T 89, and threaded into a cored out passage 93, which meshes at its lower end to admit the oil under pressure to the inner end of the respective rotor elements. Downwardly directed pipes 94, are connected into the respective T's 86 and 88, and are connected to inwardly directed horizontal pipes 95, each of which is connected to a short pipe section 96, and is threaded inwardly through the bottom of the casing 1, as shown in Fig. 6.

Figure 6:
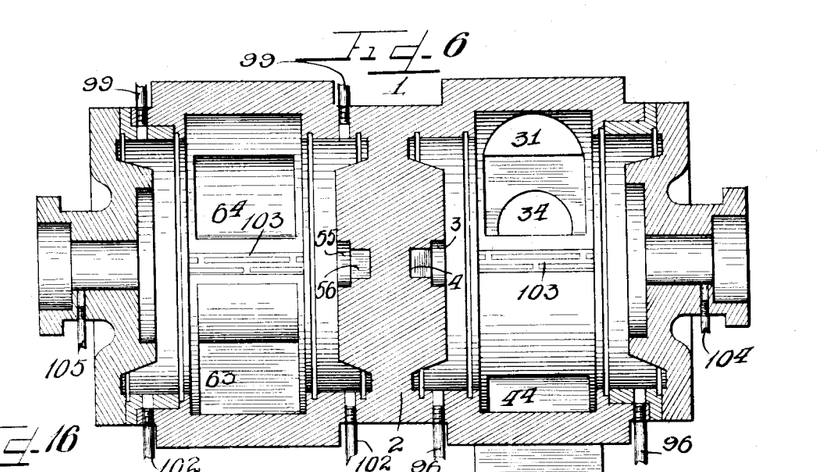
Fig. 6 is a section taken on line 6—6 of Fig. 2.

The piping for equalizing the pressure in applying lubricant to the bearings of the driven rotor, consists of one pipe 97, communicating into the chamber 63, as shown in Fig. 5, and leading outwardly and upwardly through a check valve 98, to branch pipes 99, both of which communicate through the walls of the casing, as shown in Fig. 6. Another pipe 100, communicates through the end wall of the casing into the chamber 64, as shown in Fig. 5, and leads outwardly and downwardly and to a check valve 101, to branch pipes 102, which communicate upwardly in the bottom of the casing, as shown in detail in Fig. 6.

Fig. 19 illustrates a detail of an inserted labyrinth packing 103, one each thereof being provided in the respective rotor chambers, as clearly shown in Figs. 3, 4, and 6, against which the cylindrical portions 9 and 50, of the respective rotors bear to afford a seal between the inlet and outlet to the respective rotors. Drip connections 104 and 105, respectively, are provided at each end of the transmission casing cover elements to provide a means of trapping and straining oil which may find access to the end bearings.

The operation is as follows:

The driving rotor, rotating within the casing 1, embraces the cylindrical member 9, and piston abutments 18, and inasmuch as said cylindrical element rotates about one center, namely the shaft 3, and said abutments about another center, namely the eccentrically disposed cylinder 5, a relative movement takes place therebetween, the abutments sliding through the packed slots in the walls of said cylindrical element 9, as they rotate therewith. Thus with the rotor moving in a counter-clockwise direction with reference to Fig. 3, a certain amount of fluid from the chamber 38, is drawn through the open gate valve 46, said fluid flowing behind one of the abutments 18, and the following abutment, as it sweeps across the inlet passage 44, traps the fluid and forces the same upwardly around the rotor chamber into the chamber 30. As the pressure of the fluid in the chamber 30, augments, the valve 34, opens automatically against the compression of its spring, and the fluid then flows into the outlet or pressure chamber 32. For both the chambers 30 and 32, the air bell or trap chambers 31 and 33, respectively are provided, so that the air therein may be compressed as the fluid is pumped into said respective chambers, inasmuch as the fluid itself is practically incompressible. The fluid leaving the chamber 32, through the wide outlet passage $73^a$, shown in Fig. 5, passes through the cylindrical plug valve 67, that is, in the adjustment shown, the fluid passes through the passage 70, into the lower chamber 63, which in the present instance forms the inlet chamber for the driven rotor.

Within the driven rotor chamber practically a reverse operation takes place from that already described, that is, the fluid entering through the chamber 63, flows upwardly behind one of the abutments 51, rotating the same and the cylindrical element 50, therewith. After the fluid under pressure has expended its energy in moving the rotor, it flows outwardly into the outlet chamber 64, thence through the passage 75, to the passage 71, of the rotatable valve element through the passage 76, and into the inlet chamber 38, of the other rotor element.

The driven rotor element 50, may be caused to rotate in an opposite direction by adjustment of the valve 67, so that a flow from the outlet pressure chamber 32, takes place through the passage 68, of the valve element into the upper chamber 64, of the driven rotor element, rotating the same in a clockwise direction with reference to Fig. 4, the fluid leaving by the chamber 63, through the passage 69, of the valve element, returning to the inlet chamber 38, of the driving rotor.

Said valve 67, is capable of another adjustment to a neutral position, that is, with the passage 69, connecting the outlet passage $73^a$, and inlet passage 76, of the driving rotor element, and the passage 68, connecting the respective passages 74 and 75, of the driven rotor element. When it is desired to strain the fluid of the transmission mechanism, the shaft 43, is turned through an angle of ninety degrees on the exterior of the casing, thereby throwing the gate 42, shown in Fig. 3, upwardly to close the passage 44, so that the fluid entering the chamber 38, is constrained to flow downwardly and upwardly through the screen trays 45, for admission past the gate valve 46, to the driving rotor 9. The gate valve 46, shown in Fig. 3, affords a means of controlling the power transmitted by the transmission mechanism inasmuch as said gate valve controls the quantity of fluid admitted to the driving rotor. It is also evident that this also affords a means of governing the speed of the driven rotor, inasmuch as the speed will depend upon the load to be driven by the driven element, as well as the quantity of fluid pumped thereto by the driving rotor. Inasmuch as the abutments, both in the driving rotor as well as the driven rotor, rotate about a slightly variable center, the path traced by the outer end of said abutments is not exactly circular. However, for ease of manufacture, the interior of the casing against which the outer ends of the abutments bear, is made purely circular, and the slight inaccuracy is compensated for by the packing 20, in the ends of the respective rotor abutments, which is of a resilient nature so as to normally spring outwardly, and yet capable of being compressed inwardly to afford an efficient seal at all points of movement of the rotor abutments within the casing.

The piping connections for equalizing pressure upon the ends of the rotor elements and lubricating the same, utilizes in a novel manner the pressure existent in the mechanism for forcing the fluid itself as a lubricant to these parts. That is, the pipe 81, leads fluid from the pressure chamber 30, through the pipe 81, at one side of the driving rotor, and by suitable connections to the pipe 92, leading to a cored out passage 93, in the casing 1, which conducts the fluid under pressure to the inner ends of the rotor elements, a pipe 90, also connected in the line leading to a pipe 91, to admit the fluid to the end of the driven rotor elements at the outer end of the casing. The pipes 96, which communicate through the lower end of the casing in the driving rotor compartments, are also connected to the pipe lines to receive the fluid under pressure therefrom, thus lubricating the bearings for the rotor. Either one of two sets of piping systems is in use, dependent upon the direction of rotation of the driven rotor for conducting fluid under pressure to either the upper or lower portions of the bearings thereof, as the case may be, and these connections are clearly shown in Fig. 5. One pipe 97, is adapted to receive fluid from the chamber 63, when this is the entrance chamber for one direction of rotation of the driven rotor, to conduct the oil under pressure through a check valve 98, to inlet pipes 99, at the upper ends of the casing, and similarly when the driven rotor operates in an opposite direction the pipe 100, takes a certain amount of the fluid from the then pressure chamber 64, conducting the same through a check valve 101, to the branch pipes 102, at the lower end or lower bearings of the rotor elements. The fact that the motive fluid used in this mechanism is oil, serves to maintain all of the parts well lubricated, so that wear upon the parts is a negligible quantity and ease of operation at all times is assured.

I am aware that various details of construction may be varied through a wide range without departing from the principles of this invention and I therefore do not purpose limiting the patent granted otherwise than necessitated by the scope of the appended claims.

I claim as my invention:

1. In a fluid power transmission device, a driving power element for maintaining a flow of fluid, a driven power element to be driven by the flow of fluid, a unitary casing incasing said driving and driven elements and cored out on its interior to afford communication therebetween for passage of the fluid, and slidable means for controlling the quantity of fluid passing through the device to vary the speed transmitted.

2. In a fluid transmission device of the class described, a rotary fluid compressing member, a casing within which the same is mounted, a rotary member adapted to be driven by the compressed fluid also mounted within said casing, mechanism for changing the flow of fluid between said members to change the direction of rotation of the driven member, and slidable means controlling the quantity of fluid passing through the mechanism to vary the speed and power transmitted.

3. In a fluid transmission device of the class described, a rotary fluid compressing member, a rotary member adapted to be driven by the compressed fluid, mechanisms for reversing the flow of fluid to said driven member and for by-passing the fluid to prevent flow to the driven member, and rack actuated means controlling the flow of fluid passing through the transmission device.

4. In a device of the class described, a casing, a pair of rotor chambers cored out therewithin, rotor elements mounted within said chambers, passages affording communication between said rotor chambers, means reversing the flow of fluid in the passages between said chambers, and rack and pinion mechanism controlling the flow of fluid to one of said rotors whereby the fluid compressed thereby and admitted to the other rotor may be varied in quantity to vary the power and speed to be transmitted by said second mentioned rotor.

5. In a fluid transmission device of the class described, a rotary fluid compressing member, a rotary driven member adapted to be driven by the fluid from said compressing member, each of said members embracing a rotatable cylindrical element and slidable abutments movable diametrically therethrough, and slidable rack actuated means controlling the flow of fluid between said rotor elements.

6. In a fluid transmission device of the class described, a rotary fluid compressing member, a rotary member adapted to be driven by fluid received therefrom under pressure, mechanism controlling the quantity of fluid admitted to the compressing member, means to by-pass the flow of fluid admitted to the compressing member and straining means associated therewith to strain the fluid admitted therethrough.

7. In a device of the class described, a rotary compressing element, an eccentrically mounted rotary element adapted to be driven by a fluid compressed by said compressing element, passages affording communication between said respective elements for passage of the fluid therethrough, and passage connections between the respective pressure chambers of said elements and arranged to convey the fluid under pressure to the bearings of the elements and to balance the same within the casing.

8. In a hydraulic transmission of the class described, a casing, driving and driven elements mounted therein, the driving element adapted to impart movement to a fluid in said casing to drive said driven element, a chamber formed in said casing adapted to receive the fluid therein under pressure, and passages communicating with said chamber and leading to opposite sides of said elements to balance the same in their movement in the casing.

9. In a hydraulic transmission of the class described, eccentrically mounted driving and driven elements, connections therebetween whereby fluid driven by the driving element is conveyed to the driven element to drive the same, passages to convey fluid under pressure to opposite sides of said elements to balance the same for movement, and means controlling the fluid admitted to the driving element to vary the speed and power transmitted by the transmission.

10. In a device of the class described, a casing, driving and driven elements mounted therein, a chamber adapted to receive the fluid pumped by the driving element under pressure, passages communicating with said chamber and leading to each side of said elements to balance the same in their movement in the casing, and means throttling the fluid admitted to the driving element to vary the speed and power transmitted by the driven element.

11. In a hydraulic transmission of the class described, a casing, driving and driven elements movably mounted therein whereby a flow of fluid is induced by the driving element to drive the driven element, a chamber having an air trap therein to receive the fluid under pressure to compress the air in said air trap to permit passage of the fluid to the driven element, and a slidable gate plate controlling the flow of fluid to the driving element to vary the power and speed transmitted by the driven element.

12. In a device of the class described, a casing, driving and driven rotors therein, passages affording communication therebetween whereby fluid may be pumped by the driving rotor to drive the driven rotor, packing rings interposed between the rotors and casing, and passages for transmitting the pressure of fluid pumped by the driving rotor to opposite ends of said respective rotors to balance the same for rotation in said casing.

13. In a device of the class described, a casing, driving and driven rotors mounted therein, passages affording communication therebetween whereby fluid pumped by the driving rotor serves to drive the driven rotor, packing rings concentrically mounted with respect to the rotors at the ends thereof to seal the same in the casing, and segmental retaining rings adapted to be placed into interfitting relation in the casing to hold said packing rings in place.

14. In a device of the class described the combination with a casing and its driving and driven rotors mounted therein having complemental circular grooves registering with one another in said respective casing and rotors, of packing rings mounted in said registering grooves to afford a seal for the rotors in the casing.

15. In a device of the class described, a casing, rotors mounted therein, the one adapted to pump fluid through said casing to drive the other, an air pressure chamber communicating with line of fluid communication between said rotors to afford an air cushion for fluid under pressure, a check valve in the line of communication between said driving and driven rotors, and pressure lines leading to the opposite ends of the rotors and in communication with the line of fluid pressure between said driving and driven rotors to balance the rotors in the casing.

16. In a device of the class described, a casing having grooves therein, a rotor mounted therein having peripheral grooves therein registering with said casing grooves, packing rings in said registering grooves to afford a seal for said rotor and casing, diametrically oppositely disposed packing elements associated with said rotor, and a packing member mounted in the casing for contact with the periphery of the rotor.

17. In a device of the class described, a casing, a rotor mounted therein, said rotor and casing having peripheral registering grooves, packing rings inserted therein, and passages formed in said casing to admit fluid to the opposite ends of said rotor pumped thereto under pressure by said rotor to balance the rotor in its casing and equalize the thrust due to fluid pressure on the respective packing rings.

18. In a device of the class described, a casing, driving and driven rotors therein, passages affording fluid communication between said rotors whereby fluid pumped by the driving rotor may serve to drive the driven rotor, and passages formed in said casing communicating with the line of fluid pressure between said rotors to admit fluid to the opposite ends of and at the journals of said rotors to balance the same in said casing and afford a pressure lubrication therefor.

19. In a device of the class described, a casing, driving and driven rotors mounted therein, passages affording communication for fluid whereby fluid pumped by the driving rotor may serve to drive the driven rotor, packing means associated with said respective rotors and casing to confine the effect of fluid pressure to the compartments within said casing in which the rotors operate, passages affording communication between the line of fluid pressure and the ends of said respective rotors to balance the same in the casing and lubricate said rotors, and retaining means at the ends of said casing for said packing means to confine the fluid within the casing and prevent loss of pressure therefrom.

20. In a device of the class described, a fluid compressing mechanism, and a driven mechanism adapted to be driven by the fluid from said compressing mechanism, each of said mechanisms comprises a casing, a shaft therein, an eccentric cylinder rigidly secured thereon, a ring journaled thereon, diametrically opposite flat surfaced extensions thereon, a yoke having flattened surfaces on the exterior thereof slidably mounted upon said flattened extensions and rotatable as a unit with said ring, an apertured cylinder within the casing having flat surfaces therein to permit the flattened surfaces of said yoke to slidably engage the same, diametrically oppositely disposed abutment members on said yoke slidably engaged through said cylinder apertures, and a packing in each of said abutment members to contact the inner surface of said casing as said mechanisms are rotated.

21. In a hydraulic transmission device of the class described, a driving and a driven means, each embracing a casing, a slotted cylinder rotatable therein, a yoke slidably mounted therein, abutment members secured thereon and slidably projecting through said cylinder slots to engage the inner surface of said casing to form an efficient seal, a ring member slidably mounted within said yoke, and eccentric means journaled therein for supporting the same.

In testimony whereof I have hereunto subscribed my name in the presence of two subscribing witnesses.

CARLYLE B. FUNK.

Witnesses:
CHARLES W. HILLS, Jr.,
EARL M. HARDINE.